May 19, 1964 R. R. HAGER 3,133,417
ACCUMULATOR CHARGING SYSTEM
Filed July 16, 1962

INVENTOR.
ROBERT R. HAGER
BY
William P. Hickey
ATTORNEY

United States Patent Office 3,133,417
Patented May 19, 1964

3,133,417
ACCUMULATOR CHARGING SYSTEM
Robert R. Hager, South Bend, Ind., assignor to The Bendix Corporation, South Bend, Ind., a corporation of Delaware
Filed July 16, 1962, Ser. No. 210,071
7 Claims. (Cl. 60—51)

The present invention relates to hydraulic systems of the type wherein an open center valve is supplied with pressure from a pressure source, such as a pump, and an accumulator charging valve is provided on the discharge of the open center valve for periodically charging pressure fluid to an accumulator; and more particularly to a system of this type wherein means are provided for disabling the charging valve when the supply pressure to the open center valve exceeds a predetermined value.

An object of the present invention is the provision of a new and improved and greatly simplified charging valve structure which is responsive to an accumulator pressure to simultaneously control exhaust flows from the charging valve and open and close communication to the accumulator.

Another object of the present invention is the provision of a new and improved combination power steering and power braking system of the above described type wherein means are provided for removing the back pressure that is created on the power steering valve by the accumulator charging valve whenever a simultaneous demand for pressure by the power steering system produces a total pressure demand which exceeds the maximum permissible pump delivery pressure.

A further object of the present invention is the provision of a new and improved charging valve structure of very simple design and rugged construction for simultaneously controlling back pressure on the power steering valve and for opening and closing communication to the accumulator.

A still further object of the present invention is the provision of a new and improved charging valve of the immediate above mentioned type which has a first pressure responsive element for exhausting the pressure supply to the valve when pressure in its accumulator charging port exceeds a predetermined pressure as well as a second pressure responsive element which exhausts the pressure supply to the valve when pressure from another location exceeds a predetermined limit.

Figure 1:
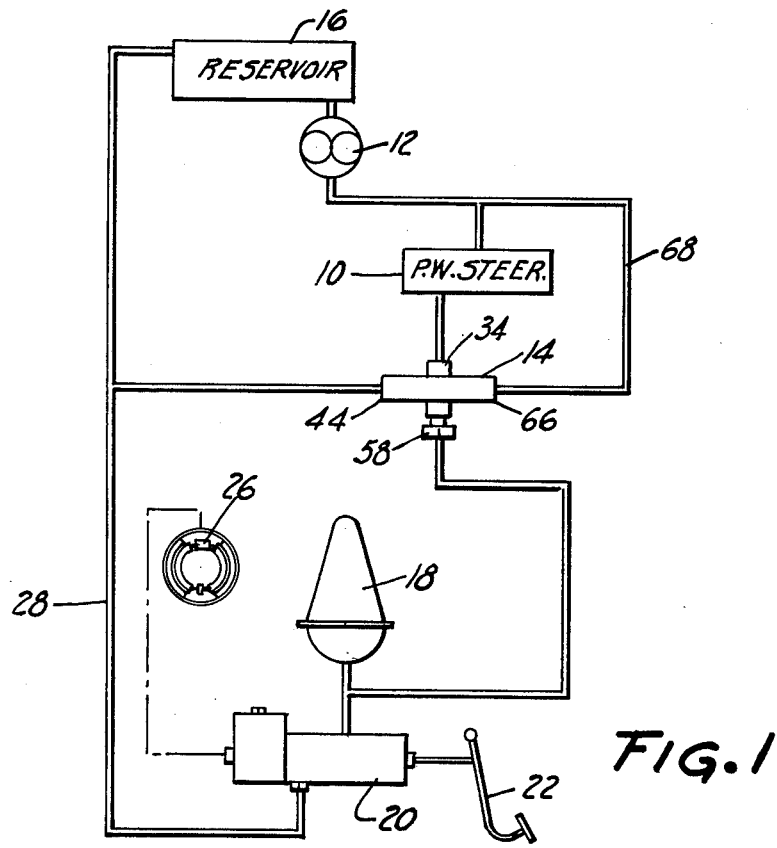
Figure 2:
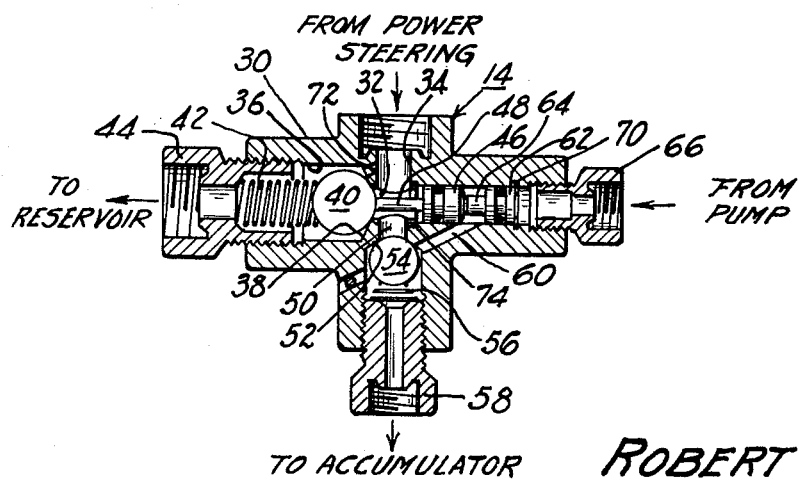

The invention resides in certain constructions and combinations and arrangements of parts; and further objects and advantages of the invention will become apparent to those skilled in the art to which the invention relates from the following description of the preferred embodiment described with reference to the accompanying drawing forming a part of the specification, and in which:

FIGURE 1 is a schematic view of a combination of hydraulic power steering and power braking system embodying principles of the present invention; and FIGURE 2 is a cross sectional view through the charging valve shown in FIGURE 1 and which embodies principles of the present invention.

The hydraulic power steering and power braking system shown in FIGURE 1 generally comprises an open center power steering valve 10 which is supplied with pressure from any suitable source, such as the positive displacement gear pump 12. By an open center valve we mean a valve through which fluid flow normally takes place without creating any appreciable back pressure, until such time as the valve is actuated. The fluid flow from the power steering valve 10 is normally recirculated through the accumulator charging valve 14 (about to be described) back to a low pressure reservoir 16, to which the suction of the pump 12 is communicated. It will be understood that in the system so far described, actuation of the power steering mechanism 10 produces a modulated back pressure upon the pump 12 which will vary in accordance with the amount of force that must be supplied to the steering linkages of the automotive vehicle on which it is mounted. This back pressure may vary up to the maximum design pressure for the pump 12 at which time a relief valve (not shown but which is normally supplied) will open to prevent damage to the pump 12. There is therefore a normal maximum differential pressure that is available to the power steering system for operating its steering linkages.

The system shown in FIGURE 1 further includes an accumulator 18 of conventional design, as for example that shown in Patent 2,880,759. The accumulator 18 is normally intended to supply motivating pressure fluid to a hydraulically actuated power brake structure 20, as for example that shown and described in the Schultz et al. Patent No. 3,074,383. The hydraulically actuated power brake structure 20, shown in the drawing, is of the closed center type whose valve structure is only opened when the brake pedal lever 22 is actuated to produce an actuation of the vehicle's brakes. The power brake 20 may be of the type which communicates the discharge pressure of the power brake valve directly to the brake applying fluid pressure motors, or as shown in the drawing may be of the type which operates an internal piston that in turn operates a pulsating motor that is connected to the brake applying fluid pressure motor. With the latter described type of power brake, the hydraulic fluid that circulates through the power steering system is kept isolated from the fluid that is used to operate the brake applying wheel cylinders 26 (only one of which is shown).

Release of the brake pedal lever 22 causes the valve structure in the power brake 20 to close communication with the accumulator 18 and dump the power brake pressure actuating fluid to the return line 28 which leads to the low pressure reservoir 16. The accumulator charging valve 14 previously referred to performs the function of valving off the normal flow through the power steering valve 10 to create a back pressure which in turn is used to divert fluid to the accumulator 18, until such time as the pressure in the accumulator 18 reaches a predetermined level. When the pressure in the accumulator 18 reaches this predetermined level, the accumulator charging valve 14 opens to dump fluid leaving the power steering valve 10 back to the reservoir 16, and simultaneously, therewith, close off communication with the accumulator 18 so that its pressure will be maintained.

The prior art has had many designs of accumulator charging valves and according to principles of the present invention there is provided a very simple, and rugged construction of accumulator charging valve having a minimum for parts which simultaneously perform the combination of functions wherein pressure in the accumulator 18 is sensed, flow through the valve is closed off to create a back pressure, and valve structure to the accumulator is simultaneously opened to divert this flow into the accumulator.

The above described functions are conveniently accomplished by means of a valve housing 30 having a longitudinally extending chamber 32 therein that is intersected by a laterally extending passage 34 which serves as the inlet port for receiving flow from the power steering valve 10. The longitudinally extending chamber 32 on one side of the transverse passage 34 is enlarged as at 36 to provide a shoulder or valve seat 38 against which a valve closure member, and preferably a ball 40, is biased by means of a valve closing spring 42. The outer end of the enlarged chamber 36 is suitably threaded for receiving a tube fitting 44 by which the chamber is communicated to the reservoir 16. The valve closure spring 42 is positioned between the ball 40 and the tube fitting 44, so that it can conveniently be compressed to provide a predetermined valve closing force upon the ball 40, by reason of which a predetermined back pressure will be maintained in the inlet port 34 when the ball 40 is allowed to rest against the valve seat 38.

The portion of the longitudinally extending chamber 32 that is on the opposite side of the inlet port 34 from the valve seat 38 is provided with a first movable wall 46 which in this instance is a piston having a suitable seal with respect to the sidewalls of the chamber 32. The piston 46 is provided with an axially extending pin 48 which extends past the inlet port 34 for abutment with the ball 40. Pressure on the opposite side of the piston 46 from the ball 40 therefore performs the function of biasing the piston against the ball 40 and lifting it from its valve seat 38.

The accumulator charging valve senses the pressure in the accumulator 18 and moves the ball valve 40 from its seat, whenever the pressure in the accumulator 18 exceeds a predetermined limit. This is accomplished by communicating pressure from the accumulator 18 to the portion of the chamber 32 outwardly of the piston 46; and this may be done, either by an external connection to the accumulator, or by a connection from the charging valve 14 which leads to the accumulator. Pressure flow to the accumulator 18 can be taken from any portion of the chamber 32 between the piston 46 and valve seat 38 or from the pressure inlet port 34. In the preferred embodiment, however, the accumulator charging connection 50 is formed by extending the transverse passage 34 to the other side of the longitudinally extending chamber 32. The accumulator charging connection 50 is enlarged adjacent its outer end to provide a shoulder or valve seat 52 against which a valve closure member 54 and preferably a ball, is biased by a light valve closure spring 56 in order to prevent return flow from the accumulator 18. The outer end of the accumulator connection is suitably threaded to receive a tube fitting 58 by means of which it is connected to the accumulator 18. The fitting 58 also holds the valve closure spring 56 in place against the ball valve 54. In the embodiment shown in the drawing, the accumulator pressure sensing connection for the piston 46 is provided by means of a transverse drilling 60 in the valve housing 30 which extends between the accumulator charging connection and the longitudinally extending chamber 32 outwardly of the piston 46. The structure so far described provides a very neat package that will perform all of the intended functions with a minimum number of simple and rugged parts.

As previously mentioned it is a further object of the present invention to provide means which will prevent the accumulator charging valve 14 from charging the accumulator when the power steering system requires a greater differential pressure than what remains between the accumulator pressure and the maximum permissible pump discharge pressure.

According to principles of the present invention, means are provided which senses the need of the power steering system for more pressure and which in turn stops the charging of the accumulator 18, and dumps the discharge of the power steering valve 10 to the low pressure reservoir 16, in order that greater pressure differential is available for the operation of the power steering system. This function is accomplished in the structure shown in FIGURE 2, by means of a second movable wall or piston 62 that is located in transverse passage 32 on the opposite side of piston 46 from the valve seat 38. The piston 62 is provided with a pin portion 64 which abuts the outer face of the piston 46 for the purpose of biasing it against the ball 40, and thereby lift the ball 40 off of its valve seat 38. The opposite side of the second movable wall or piston 62 is communicated to the discharge of the pump 12 by means of a pump pressure connection 66, and hydraulic line 68, which communicates the outer end of the transverse chamber 32 to the pump discharge pressure being supplied to the power steering valve 10. A suitable snap ring 70 is provided in the sidewalls of the chamber 32 to prevent pressure on the inner end of the piston 62 from biasing it outwardly of the chamber 32.

Assuming that the combination power braking-power steering system shown in FIGURE 1 is completely filled with liquid and the accumulator 18 is at atmospheric pressure, operation of the pump 12 will induce fluid flow through the open center power steering valve 10 to the inlet port 34 of the accumulator charging valve 14. As has previously been described, the ball 40 and valve closure spring 42 form a back pressure valve for exerting a predetermined back pressure upon the flow that is received from the open center power steering valve 10; and in the present instance, the coil spring 42 and the valve seat 38 are so sized as to hold approximately 450 p.s.i. back pressure in the inlet port 34. The valve spring 56 is a very light spring and is just intended to be strong enough to hold the ball valve 54 against the seat 52 to prevent return flow out of the accumulator. Pressure in the inlet port 34 of the charging valve 14 therefore lifts the ball 54 off of its seat, so that flow continues on to the accumulator 18 until such time as its pressure reaches 450 p.s.i. During this time, the back pressure produced by the ball valve 40 is exerted upon the inner end of the piston 46; and because the coil spring 56 is very light, substantially the same pressure flows through the passage 60 to the opposite side of the piston 46, so that no force is exerted on the ball valve 40 by the piston 46. It will further be assumed that the pressure drop through the normally open power steering valve 10 is comparatively small, so that the pressure which is communicated through the pump pressure discharge sensing line 68 to the outer surface of the outer piston 62 is only slightly higher than the pressure being supplied to the accumulator. Only a small biasing force is exerted upon the outer piston 62 therefore to help bias the ball valve 40 away from its seat 38.

Flow to the accumulator, therefore, continues until the pressure in the inlet port 34 plus the small additional force on the outer piston 62 is just sufficient to move the ball 40 away from its seat 38 and allow flow to throttle past the ball 40 back to the low pressure reservoir 16. This will take place at a pressure just below 450 p.s.i. by an amount corresponding to the force produced by the outer piston 62. Once this condition has been reached, and the ball 40 starts to throttle and produce a constant back pressure on the inlet port 34, flow to the accumulator 18 ceases. Thereafter the ball valve 40 continues to throttle until such time as the power steering valve is actuated to partially close off flow from the power steering valve to the inlet port 34. During actuation of the power steering valve, the pump discharge pressure 12 increases by an amount corresponding with the throttling that is produced at the power steering valve; and this increase in pressure is transmitted through the line 68 to the outer face of the outer piston 62 to produce an additional force upon the ball 40 which moves and holds it off of its seat. Thereafter pressure in the inlet port 34 decreases. In those instances where the piston 62 is of a larger diameter than the valve seat 38, it will act upon the inner piston 46 so as to exert an additional force upon the ball 40 causing it to open still further; so that the ball 40 is lifted out of a throttling position to a completely open one wherein the inlet port 34 is substantially completely dumped to the low pressure reservoir 16.

In those instances where it is desired that a reduction in pressure in the inlet port 34 will produce a force on the piston 46 which will cause the ball 40 to move out of its throttling position to its open position unaided by the force of piston 62, it is necessary that valve seat 38 will have a cross sectional area which is smaller than the cross section of the piston 46. The pressure force upon the piston 46 therefore which tends to unseat the ball is greater during a drop in pressure in the port 34 than is the reduction in the pressure force on the ball 40. Once the ball has been moved and held completely clear of its seat, charging of the accumulator stops and no appreciable black pressure is exerted against the power steering valve 10.

In order to decrease the amount of actuation of the power steering valve 10 that is required to cause the ball valve 40 to move out of its throttling position to its wide open position, a suitable leakage path may be provided (as by the orifice 72) for the fluid which is trapped between the back pressure valve 40 and the power steering valve 10. By the inclusion of the leakage path 72, any pressure fluid which is trapped between the power steering valve 10 and the ball valve 40 at the time that the power steering valve 10 is actuated will be quickly bled off through the leakage path 72; so that the pressure in the inlet port 34 is quickly reduced to cause a snap actuation of the piston 46 and the lifting of the ball valve 40 clear and free of its throttling position. The leakage path 72 may not in all cases be necessary; and a similar function can be provided by a leaking valve seat 38 which is either intentionally provided by means of grooves formed in the valve seat 38, or by reason of surface irregularities produced during usage of the valve.

When the steering operation has been completed and the power steering valve 10 is moved back to its normally open center position, the pressure force upon the outer surface of the piston 62 is reduced so that accumulator pressure in the passage 60 biases the piston 62 out of engagement with the piston 46 to hold it up against the snap ring 70. Inasmuch as the diameter of the piston 46 is appreciably greater than the valve seat 38, pressure forces on the piston 46 will hold the ball valve 40 away from its seat 38 until the accumulator pressure has dropped below the 450 accumulator charging pressure by an appreciable amount which in the embodiment shown in the drawing may be approximately 100 p.s.i. The accumulator 18 is preferably sized to permit the actuation of the braking system several times with the amount of fluid flow out of the accumulator that is required to reduce the accumulator pressure from 450 p.s.i. to 350 p.s.i. As the accumulator pressure approaches 350 p.s.i., the coil spring 42 biases the ball valve 40 within throttling distance of its valve seat 38 to start to create back pressure on the inner end of the piston 46 which thereby decreases the pressure forces on the piston 46 and allows the ball valve 40 to assume its throttling position. Charging of the accumulator 18 therefore continues until approximately 450 lbs. pressure is reached, whereupon the ball valve 40 is caused to throttle, until the power steering valve 10 is again actuated, and the cycle repeated. A snap ring 74 will preferably be provided to limit inward movement of the inner piston 46.

If during the time that the ball valve 40 is within throttling distance of its valve seat 38 to charge the accumulator 18, the power steering valve 10 is actuated to a sufficient degree that its demand for pressure differential when placed on top of that developed by the accumulator charging valve 14 produces a total pressure demand which exceeds the predetermined safe discharge limit of the pump 12, the pressure in the line 68 will cause the outer piston 62 to move inwardly and bias ball valve 40 away from its seat 38 and thereby dump the back pressure which it exerts on the power steering system. This then allows the full pump discharge pressure to be used by the power steering system in deference to the charging of the accumulator 18.

It will now be seen that the objects of the present invention have been achieved, and that there has been provided a very simple and inexpensive valve for controlling the charging of an accumulator; and which when used on the discharge side of an open center power steering valve, will disrupt its accumulator charging operation to remove back pressure on the power steering valve when the simultaneous steering and accumulator charging operations would not give the power steering valve sufficient pressure differential to satisfy the demand on the power steering system.

While the invention has been described in considerable detail, I do not wish to be limited to the particular embodiment shown and described; and it is my intention to cover hereby all novel adaptations, modifications and arrangements thereof which come within the scope of the appended claims.

I claim:

1. In a combination power steering-power braking system, and the like: a hydraulic pump, an open center power steering valve supplied with pressure from said pump and having a discharge for exhausting fluid, an accumulator for storing pressure fluid, and an accumulator charging valve having a longitudinally extending chamber having an inlet port communicating with said discharge of said power steering valve, said longitudinally extending chamber having a first valve seat positioned on one side of said inlet port and facing away from said inlet port, said valve seat communicating to low pressure, a first poppet member for closing off said first valve seat, first means biasing said poppet with generally predetermined force to provide a predetermined back pressure on said inlet port, a movable wall across said longitudinal chamber and positioned on the opposite side of said inlet port from said valve seat, said movable wall having a portion which engages said first poppet member and which moves said first poppet member off of its seat when moved toward said valve seat, means communicating said discharge of said power steering valve to said accumulator, said means including a check valve for preventing return flow from said accumulator, and means communicating pressure from said accumulator to the side of said movable wall opposite of said first valve seat, and whereby simple structure responsive to accumulator pressure is provided for simultaneously regulating return and accumulator flows.

2. In a combination power steering-power braking system, and the like: a hydraulic pump, an open center power steering valve supplied with pressure from said pump and having a discharge for exhausting fluid; an accumulator for storing pressure fluid, back pressure valve means for creating a back pressure on said discharge of said power steering valve; charging valve means for communicating back pressure from said back pressure valve to said accumulator and for preventing return flow from said accumulator; means responsive to pressure in said accumulator for causing said back pressure means to create a back pressure and opening said charging valve means when the pressure in said accumulator drops below a predetermined value, and for opening said back pressure valve means and closing said charging valve means when the pressure of said accumulator exceeds a predetermined value; and means responsive to the supply pressure to said power steering valve for opening said back pressure valve when said supply pressure exceeds a predetermined value.

3. In a combination power steering-power braking system, and the like: a hydraulic pump, an open center power steering valve supplied with pressure from said pump and having a discharge for exhausting fluid, an accumulator for storing pressure fluid, and an accumulator charging valve having a longitudinally extending chamber having an inlet port communicating with said discharge of said power steering valve, said longitudinally extending chamber having a first valve seat positioned on one side of said inlet port and facing away from said inlet port, said valve seat communicating to low pressure, a first poppet member for closing off said first valve seat, first means biasing said poppet with generally predetermined force to provide a predetermined back pressure on said inlet port, a movable wall across said longitudinal chamber and positioned on the opposite side of said inlet port from said valve seat, said movable wall having a portion which engages said first poppet member and which moves said first poppet member off of its seat when moved toward said valve seat, means communicating said discharge of said power steering valve to said accumulator, said means including a check valve for preventing return flow from said accumulator, and means communicating pressure from said accumulator to the side of said movable wall opposite of said first valve seat, and a second movable wall pressure biased against said first movable wall for moving said first poppet member off of its seat, said second movable wall being pressure actuated by supply pressure to said power steering valve.

4. An accumulator charging valve comprising: a body member having a longitudinally extending chamber, that is intersected by a transversely extending fluid flow passage, said transverse passage having a pressure inlet port on one side of said longitudinally extending chamber and an accumulator charging passage on the other side of said chamber, said accumulator charging pressure being enlarged to form a valve seat which faces away from said chamber, a first valve closure member biased against said seat, said longitudinally extending chamber being enlarged on one side of said transverse passage to form a second valve seat which faces away from said passage, a second valve closure member biased against said second valve seat, a movable wall in said longitudinally extending chamber on the other side of said transverse passage from said second valve seat, said movable wall abutting said second valve closure member, and means communicating pressure from said first mentioned enlarged chamber to the side of said movable wall opposite from said second valve closure member.

5. An accumulator charging valve comprising: a body member having a longitudinally extending chamber, that is intersected by a transversely extending fluid flow passage, said transverse passage having a pressure inlet port on one side of said longitudinally extending chamber and an accumulator charging passage on the other side of said chamber, said accumulator charging passage being enlarged to form a valve seat which faces away from said chamber, a first valve closure member biased against said seat, said longitudinally extending chamber being enlarged on one side of said transverse passage to form a second valve seat which faces away from said passage, a second valve closure member biased against said second valve seat, a movable wall in said longitudinally extending chamber on the other side of said transverse passage from said second valve seat, said movable wall abutting said second valve closure member, passage means communicating pressure from said first mentioned enlarged chamber to the side of said movable wall opposite from said second valve closure member, a second movable wall positioned in said longitudinally extending chamber on the opposite side of said passage means from said first movable wall and abutting said first movable wall, and means for communicating external pressure onto said second movable wall toward said second valve closure member.

6. In a combination power steering-power braking system, and the like: a hydraulic pump, an open center power steering valve supplied with pressure from said pump and having a discharge for exhausting fluid; an accumulator for storing pressure fluid, back pressure valve means for creating a back pressure on said discharge of said power steering valve; charging valve means for communicating back pressure from said back pressure valve to said accumulator and for preventing return flow from said accumulator; means responsive to pressure in said accumulator for causing said back pressure means to create a back pressure and opening said charging valve means when the pressure in said accumulator drops below a predetermined value, and for opening said back pressure valve means and closing said charging valve means when the pressure of said accumulator exceeds a predetermined value; means responsive to the supply pressure to said power steering valve for opening said back pressure valve when said supply pressure exceeds a predetermined value; and means providing a leakage path for fluid trapped between said back pressure valve and said discharge of said power steering valve; and whereby closing of said power steering valve quickly causes said back pressure valve means to open.

7. In a combination power steering-power braking system, and the like: a hydraulic pump, an open center power steering valve supplied with pressure from said pump and having a discharge for exhausting fluid, an accumulator for storing pressure fluid, and an accumulator charging valve having a longitudinally extending chamber having an inlet port communicating with said discharge of said power steering valve, said longitudinally extending chamber having a first valve seat positioned on one side of said inlet port and facing away from said inlet port, said valve seat communicating to low pressure, a first poppet member for closing off said first valve seat, first means biasing said poppet with generally predetermined force to provide a predetermined back pressure on said inlet port, a movable wall across said longitudinal chamber and positioned on the opposite side of said inlet port from said valve seat, said movable wall having a portion which engages said first poppet member and which moves said first poppet member off of its seat when moved toward said valve seat, means communicating said discharge of said power steering valve to said accumulator, said means including a check valve for preventing return flow from said accumulator, means communicating pressure from said accumulator to the side of said movable wall opposite of said first valve seat, and means providing leakage paralleling said first poppet member and valve seat to relieve trapped fluid pressure between said power steering valve and said first poppet member when it abuts its seat.

References Cited in the file of this patent

UNITED STATES PATENTS 2,850,878    Sampietro et al. _____ Sept. 9, 1958
2,880,586    Lincoln _____ Apr. 7, 1959